United States Patent [19]
Kaneko et al.

[11] 3,949,804
[45] Apr. 13, 1976

[54] METHOD OF MANUFACTURING A METAL-IMPREGNATED BODY

[75] Inventors: Yasuhisa Kaneko, Toyota; Yoshiro Komiyama, Okazaki; Katsumi Kondo, Toyota; Fumiyoshi Noda, Toyota; Hideki Murakami, Toyota; Kunihiko Uchida, Okazaki, all of Japan

[73] Assignee: Toyota Jidosha Kogyo Kabushiki Kaisha, Toyota, Japan

[22] Filed: Mar. 21, 1974

[21] Appl. No.: 453,427

[30] Foreign Application Priority Data
Mar. 26, 1973 Japan.............................. 48-34302

[52] U.S. Cl. .................. 164/62; 164/69; 164/75; 164/120; 164/129; 29/527.3; 427/294
[51] Int. Cl.² ........................................ B22D 27/16
[58] Field of Search .......... 164/80, 97, 59, 62, 120, 164/309, 318, 251, 75, 58, 100, 103, 104, 105, 69, 129, 119, 113, 316, 317, 98, 91, 61, 65; 75/204, 208; 29/182.1, 473.1, 527.3, 182.7, 182.8; 152/210; 427/294

[56] References Cited
UNITED STATES PATENTS

| | | | |
|---|---|---|---|
| 2,192,792 | 3/1940 | Kurtz | 29/182.1 |
| 2,612,443 | 9/1952 | Goetzel et al. | 29/182.1 |
| 2,922,721 | 1/1960 | Tarkan et al. | 29/527.3 |
| 3,473,900 | 10/1969 | Sara | 164/97 |
| 3,547,180 | 12/1970 | Cochran et al. | 164/62 |
| 3,599,601 | 8/1971 | Ishikawa et al. | 164/61 |
| 3,695,335 | 10/1972 | Cannell et al. | 164/97 |
| 3,853,635 | 12/1974 | Demerdi | 164/120 X |

Primary Examiner—Ronald J. Shore
Attorney, Agent, or Firm—Brisebois & Kruger

[57] ABSTRACT

The present invention relates to a method of manufacturing a metal-impregnated body in which a porous body is immersed under sub-atmospheric pressure in a molten alloy for impregnation with said alloy or a porous body is immersed under elevated pressures produced by various gases, the pressure then being reduced to normal level, after which the porous body is introduced together with a molten alloy into a metal mold, in which said molten alloy is impregnated into said porous body. The porous body is then separated from said molten alloy.

7 Claims, 1 Drawing Figure

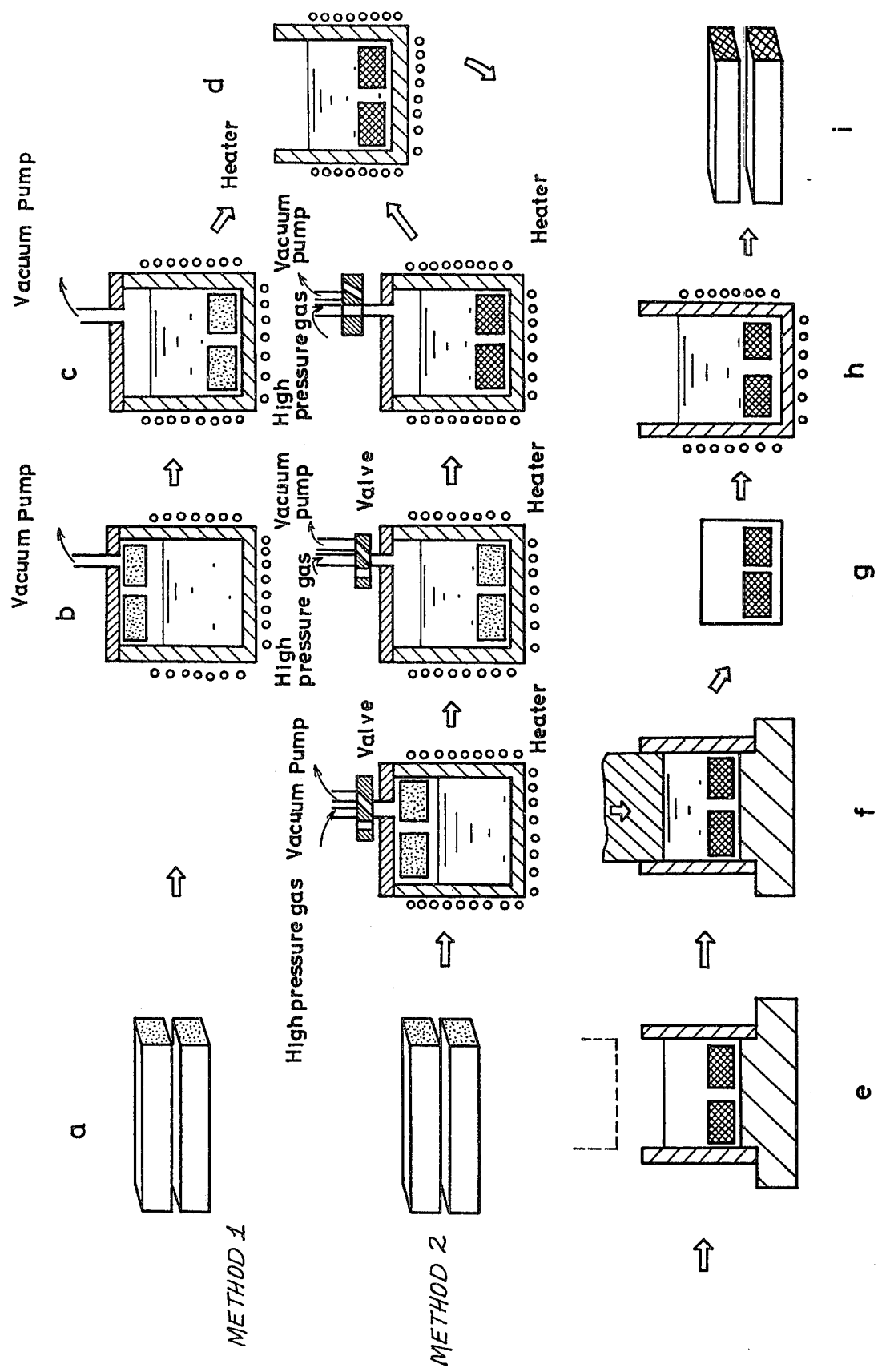

METHOD OF MANUFACTURING A METAL-IMPREGNATED BODY

BACKGROUND OF THE INVENTION

There are two conventional methods of impregnating a porous body with a molten alloy: (1) According to one method, which is called the autoclave process, a porous body is impregnated with molten metal under vacuum in a pressure vessel and then, under elevated pressures exerted by various gases, further impregnated with said molten metal. (2) According to the other method, a vacuum capsule holding a porous body sealed therein is submerged in the molten metal of a metal mold and then, under elevated pressure, said capsule is broken.

Method (1) calls for high temperatures (800° – 1000°C) and high pressures (1000 – 2000 atm.). The facilities to withstand these conditions have to be large and expensive and mass production is impossible. Moreover, there is a risk that the pressure vessel will burst. Method (2), involves the difficulty of sealing the porous body into a vacuum capsule, and is also unfit for mass production.

SUMMARY OF THE INVENTION

The present invention relates to a simplified process of impregnating a porous body with molten metal which requires no high temperature, no high pressure in a melting furnace and no sealing in a vacuum capsule.

BRIEF DESCRIPTION OF THE DRAWING

The drawing discloses two techniques for impregnating porous bodies according to the invention, in schematic form. Method 1 differs from method 2 by the application of pressure to the furnace prior transferring the body and alloy to a pressurizing mold.

DETAILED DESCRIPTION OF THE INVENTION

The present invention comprises the following three steps: In the first step a porous body, for example a sintered or molded body of silicon nitride, alumina, carbon, etc. is immersed for several minutes in a molten alloy under less than atmospheric pressure, thereby impregnating the surface of said porous body with molten alloy. In this step, the surface pores of the porous body are filled with molten alloy, while its internal pores are under sub-atmospheric pressure. After restoration to normal pressure or elevated to high pressure, the deep pores of the porous body will become filled with molten alloy.

Consequently, in the second step, said porous body is put into a metal mold and is heated together with molten alloy under pressurization, so that the internal pores of said porous body are forcibly impregnated with molten alloy. When the internal pores in the first step have not been held in vacuum but simply held under a relatively low pressure, an increased pressure has to be applied for metal impregnation. Even in that case, however, the application of several tens of atmospheres will suffice. The porous body in the molten metal is cooled until it solidifies.

In the third step, the porous body trapped in a solidified metal is reheated to separate it from the molten alloy.

Unlike the conventional process, the process according to the invention, which calls for no high temperature and no high pressure in a melting furnace, involves little risk that the pressure vessel will burst; requires no great expense for installation; comprises no step requiring the use of a vacuum capsule; and is accordingly simple and fit for mass production.

The metal-impregnated body manufactured in accordance with the present invention, which is characterized by forcible impregnation with molten alloy in two stages, has the merits of being high in the rate of metal impregnation as well as in strength.

Several specific examples of the manufacturing process according to the present invention will now be described.

EXAMPLE 1

Ten pieces of sintered silicon nitride (10 mm × 10 mm × 80 mm) having a porosity of 20.0 – 21.0 percent were placed in a vacuum furnace, and submerged in a molten pool of aluminum alloy (JIS-AC7B consisting of 10percent by weight of Mg and the rest being Al) under $10^{-2}$ mmHg, at 750°C. When air was thereafter introduced, the sintered surface became impregnated with said aluminum alloy.

These pieces of sintered silicon nitride were then taken out of the molten pool and the depth of impregnation of the aluminum alloy into the sintered surface was measured, averaging 0.6 mm. These pieces were again submerged for five minutes in said molten pool. In this state the molten pool of aluminum alloy was introduced into a metal mold and said aluminum alloy was impregnated into said sintered silicon nitride under a pressure of 2000 kg/cm². After solidifying, the sintered silicon nitride pieces were removed by heating and melting the aluminum alloy. The rate of metal impregnation in these pieces turned out 93.4 – 97.3 percent and their breaking strength ranged from 2420 to 2675 kg/cm². The breaking strength was found by holding a test piece (10 mm × 35 mm × 6 mm) over a 30 mm span, centrally loading it at a rate of 0.2 mm/min, and measuring the magnitude of the load under which the piece broke.

EXAMPLE 2

Sintered silicon nitride pieces having a porosity of 36.7 percent (10 mm × 50 mm × 100 mm), treated in a vacuum furnace in the same way as in Example 1, had their sintered surfaces impregnated with an aluminum alloy (JIS-AC7B). The depth of impregnation of the aluminum alloy into the sintered surface turned out about 1.3 mm. Sintered pieces of silicon nitride thereafter treated as in Example 1 exhibited a metal impregnation rate of 98.1 percent and a breaking strength of 1753 kg/cm².

EXAMPLE 3

Ten pieces of sintered alumina having a porosity of 19.5 percent (10 mm × 50 mm × 80 mm), held in a vacuum furnace (3 × $10^{-2}$ mmHg), were submerged in a molten pool of silver alloy consisting of 95 percent by weight of Ag and 5 percent of Cu at 1100°C under vacuum; and when air was introduced, the sintered surface was impregnated with silver alloy.

After treatment, the sintered alumina pieces were lifted out of the molten pool and the depth of impregnation of the silver alloy into the sintered surface was measured to be about 1.6 mm. Again, the sintered alumina pieces were dipped for 5 minutes in said molten pool and in this state the pool of silver alloy was placed in a metal mold. Then under a pressure of 1000 kg/cm$^2$, the sintered alumina was impregnated with silver alloy and solidified. The same treatment as in Example 1 was then followed and the resulting sintered alumina exhibited a metal impregnation rate of 98.3 percent and a breaking strength of 3210 kg/cm$^2$.

EXAMPLE 4

Sintered silicon nitride pieces having a porosity of 27.1 percent (10 mm × 10 mm × 100 mm) was submerged in a molten pool of aluminum alloy (JIS-AC8A consisting of 11 percent by weight of Si, 1.5 percent Cu, 1.5 percent Ni, 1.0 percent Mg, 0.4 percent Fe, 0.15 percent Ti, the rest Being Ag) and held under a partial vacuum of 10$^{-2}$ mmHg, at 750°C within a vacuum furnace capable of withstanding a pressure of 5 atm. Nitrogen gas was then introduced, and the furnace was maintained at 5 atm for ten minutes. The nitrogen gas was then replaced with air, and the sintered surface impregnated with aluminum alloy. Next the sintered pieces were lifted out of the molten metal to measure the depth of impregnation of the aluminum alloy into the sintered surface, which turned out about 0.9 mm. Thereafter the same treatment as in Example 1 was followed, and the resulting sintered body exhibited a metal impregnation rate of 95.7 percent and a breaking strength of 2165 kg/cm$^2$.

EXAMPLE 5

A piece of carbon having a porosity of 16.7 percent (10 mm × 50 mm × 100 mm) and an ingot of aluminum alloy (JIS-AC8A) were placed in an autoclave, heated to 750°C in a partial vacuum (5 × 10$^{-2}$ mmHg) until said piece of carbon became submerged in a molten pool of aluminum alloy. Next a pressure vessel was pressurized up to 30 atm by the introduction of nitrogen gas thereinto and held at this pressure for 10 minutes to impregnate the carbon with aluminum alloy. After restoration to ambient pressure, the carbon was lifted out of the molten pool. The rate of metal impregnation into the carbon turned out 85.4 percent, while the breaking strength proved to be 1170 kg/cm$^2$.

The carbon piece was again dipped for five minutes into the molten pool of aluminum alloy. It was then treated as in Example 1. The carbon piece exhibited metal impregnation rate of 98.7 percent and a breaking strength of 2170 kg/cm$^2$.

EXAMPLE 6

Silicon nitride powder less than 10 μ in diameter was molded in a metal molding press under a pressure of 1500 kg/cm$^2$ to form a block 10cm long × 10 cm wide × 1cm high, its density being 2.03 g/cm$^3$. The block was immersed in a molten pool of aluminum alloy (JIS-AC7B) in a vacuum furnace (3 × 10$^{-2}$ mmHg) to impregnate its surface with aluminum alloy. The depth of impregnation of the aluminum alloy into the block surface was about 1 mm.

Next, the block was treated in the same way as in Example 1 and the resulting product had a breaking strength of 1970 kg/cm$^2$.

As described above, the present invention provides a safe, mass-production method of manufacturing a metal-impregnated body, which requires no melting furnace capable of withstanding high pressure as required in the conventional process, and involves no risk that the pressure vessel will burst. Moreover, the present invention results in a high rate of metal impregnation and has many other advantages.

We claim:

1. Method of manufacturing a metal-impregnated body which comprises the steps of:
    introducing a porous body into a vacuum furnace at a subatmospheric pressure to reduce the pressure in pores of the body to sub-atmospheric pressure;
    submerging said body in a molten pool of alloy in the furnace to fill the surface pores of the body with molten alloy while its internal pores are under sub-atmospheric pressure;
    raising the pressure in the furnace to at least atmospheric pressure to partially impregnate the body with the alloy;
    removing the molten alloy and body from the furnace;
    placing the molten alloy and body in a pressurizing mold with the body submerged in the alloy;
    applying high pressure to the molten alloy and said body in the mold to further impregnate the body with the alloy;
    cooling the molten alloy and the so impregnated body in said mold while maintaining the high pressure, to solidify the molten alloy around the impregnated body;
    re-heating the solidified alloy and said impregnated body to re-melt the alloy; and
    removing the impregnated body from the re-melted alloy.

2. A method according to claim 1 wherein
    said step of introducing a porous body into a vacuum furnace comprises
        introducing a plurality of porous bodies into the furnace; and
    treating each of said plurality of bodies in the manner specified for said porous body, to obtain a plurality of impregnated bodies.

3. A method according to claim 1 wherein
    said step of raising the pressure in the furnace comprises
        introducing a gas to the furnace to raise the pressure to a pressure above atmospheric, but below several atmospheres.

4. A method according to claim 1 wherein
    said step of raising the pressure in the furnace comprises
        introducing a gas to the furnace to raise the pressure in the furnace to a pressure above atmospheric pressure but not greater than about 5 atmospheres.

5. A method according to claim 1 wherein
    said step of applying high pressure to the mold comprises
        applying a pressure in the range of about 1,000 Kg/cm$^2$ to 2,000 Kg/cm$^2$.

6. A method according to claim 1 wherein
    said porous body is a body selected from the group consisting of carbon, pressed silicon nitride powder, sintered silicon nitride, and sintered alumina.

7. A method according to claim 6 wherein
    said molten alloy is an alloy selected from the group consisting of an aluminum alloy, and a silver alloy.

* * * * *